Aug. 11, 1964 A. ZIEGLER 3,144,320
METHOD FOR THE HEATING OF ARTICLES MADE OF GLASS
Filed March 22, 1960
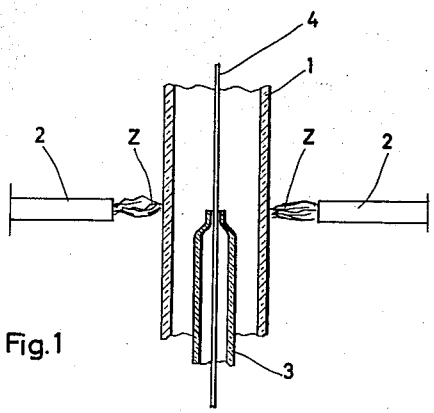
Fig.1
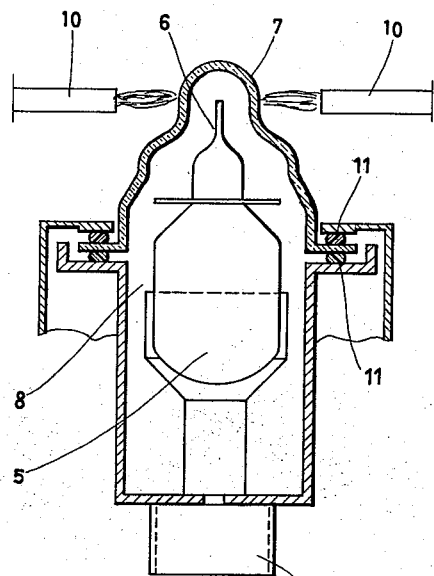
Fig. 2
INVENTOR

3,144,320
METHOD FOR THE HEATING OF ARTICLES MADE OF GLASS
Alois Ziegler, Augsburg, Germany, assignor to Patent-Treuhand-Gesellschaft für elektrische Gluhlampen m.b.H., Munich, Germany
Filed Mar. 22, 1960, Ser. No. 16,895
Claims priority, application Germany Apr. 7, 1959
1 Claim. (Cl. 65—108)

The invention relates to a method and device for the heating of articles made of glass to higher temperatures and, more particularly, to a method and devices for heating glass articles to such temperatures that the resulting softening permits deformation of the glass.

The method usually applied for this purpose consists in heating by means of a gas flame that part of the glass article which is to be deformed and to support or to effect the intended deformation by mechanical force. Though this method works quite satisfactorily in many cases because of its economy, the convenient adjustment of the desired heat supply and the speed of temperature increase to be achieved thereby, it proves unsuited for many purposes of utilization. In many cases it is undesirable that flames contact the glass or the metal parts sealed therein in view of the danger arising from a chemical reaction on the surface of the glass or of the metals. Besides, on heating with gas flames it is difficult to avoid irregular heating, thus leading in some cases to a destruction of sealings or other glass parts which are particularly delicate becaue of their shaping, such as plane windows, complicated fusions or thick-walled spots. Due to the forming of combustion gases the heating up of glass parts by means of gas burners leads to immense difficulties in all those cases where this operation is carried out in closed chambers.

It is well-known to effect sealing of incandescent lamps and combustion photoflash lamps with a gasfilling exceeding atmospheric pressure in superpressure chambers having gas burners mounted therein. But the combustion gases lead to complications often requiring the provision of special chimneys in order to dissipate the gases and vapors forming therein to the outside. This results in great losses of the gas under superpressure filling the pumping chamber. If a body is to be supplied with heat and is in vacuum in order to be degassed or deformed, then a direct heating by means of gas flames is quite generally out of question.

With regard to the difficulties resulting from gas heating, methods have already been developed to electrically produce the required heat. For this purpose an electric heating element is mounted near the glass transferring its heat by means of heat conduction to the part of the glass body to be fused. However, this method is hardly suited for mass production since the close contact necessary between heating element and work piece leads to difficulties due to the continuous delivery of finished work pieces and feeding of new work pieces during operation procedures. Another well-known method consists in using for heating a dielectric high-frequency heating of the glass, thus obviating the use of a heating element which represents an obstacle for mechanical manufacture. This latter method, however, is not only uneconomical but its utilization proves also unfavorable because of the difficulties occurring in supplying high-frequency energy in many cases, as, e.g., with the pumping-chamber-method. A really reliable shielding for the metal parts which does not simultaneously decrease the high-frequency field in the glass considerably is hardly possible with the usually small dimensions of the articles in question (electron tubes, lamps, glass inleads, cathode-ray tubes).

It is the general object of the present invention to avoid and overcome the foregoing and other difficulties of and objections to prior-art practices by the provision of an improved method for the heating of articles made of glass to temperatures at which softening of the glass allowing a deformation of the article occurs.

Another object of the invention is the provision of a method of economically heating glass articles without damaging the article by glass flames.

A further object of the invention is to provide an apparatus for sealing electric lamps filled with gas of any desired pressure within a vacuum chamber.

Other objects and advantages of the invention will become apparent as the description proceeds.

According to the invention a body of thermostable glass such as quartz glass is heated, preferably by means of a gas burner. This quartz body then serves as a heater element and in its turn heats the glass article. It was found that the heat radiation emitted by the quartz glass suffices for effecting heating up of the glass which, with regard to speed and economy, very nearly equals the direct gas heating and displays quite a number of advantages as compared therewith. In a device for carrying out the invention the quartz glass may serve as part of the wall of a pressure or vacuum chamber containing the work piece to be processed. If a gas atmosphere is still present between the heating element of quartz glass and the glass body to be heated, then the radiation heating is additionally supported by heat conduction and convection. Instead of quartz glass another glass may be utilized such as a tempered glass or a glass melting at a higher temperature than the glass to be processed.

A device is already known for heating up a body enclosed in vacuum by radiation, but the radiation source is mounted in the same vacuum and is by no means identical with the wall of the chamber and neither consisted of quartz glass nor glass. In addition, in order to avoid an interference from gas delivery it has been described to mount the radiator in a special radiation-transmissive evacuated room, this evacuated room being located within the main vacuum. Furthermore, devices have been described wherein the body to be heated is mounted in one, and the radiator is mounted in the other focus of an ellipsoidal reflector. For obvious reasons devices of this kind are unsuited for industrial mass production. The employment of heat radiation for the heating up of glass articles in order to deform or degas them became initially possible by the present invention, as based on the special properties of the quartz glass.

The poor heat conductivity permits by means of sharply bounded gas flames intense heating of a limited narrow zone of quartz glass, this zone being directly opposite to the glass portion to be heated up. A further explanation for the surprisingly quick heating up of the glass might be the selective heat radiation of the quartz glass coming within the range of wave lengths exceeding $3.6\mu$ at which glass shows a maximum absorption. Furthermore, the high melting point of the quartz glass is of importance which permits the quartz radiatior to be heated to a temperature exceeding that where the normally used types of glasses soften.

The special advantages of the inventive method are given by the fact that during heating up of the glass there will be no contact of injurious hot gases with the glass or with the metal parts connected therewith, that an absolutely uniform heating of the glass and other structural elements is ensured and no privileged heating, e.g., of the metal parts, is effected. If the gas burners heating the quartz glass are provided with a reducing flame there cannot be found any devitrification of the quartz glass even after several hundred hours of operation. The heating-up period necessary for melting the glass depends of course upon the quantity of glass to be heated, the heating power of the gas burners and the type of glass and is about between 10 and 60 seconds. In some cases it is possible to blacken the portion of glass to be heated and thus to further reduce the period of time necessary for heating up.

In special cases electric heating of the quartz radiator by means of an electric current or high-frequency proves favorable. In the latter case a metal electrode resting on the quartz radiator and being preferably of annular shape is designed to generate a particularly narrow heating zone. In this case it is possible—contradictory to the direct high-frequency heating for instance with electrodes serving simultaneously for screening purposes—to keep the high-frequency field at the place of the workpiece itself very small so that no destruction of sealed-in metal parts is encountered. The present invention does not only serve for the heating and processing of glass but may be utilized with advantage also for the treatment of other materials the processing temperature of which is below 800° C.

For better understanding of the present invention reference should be had to the accompanying drawings:

FIG. 1 is a cross sectional view of an apparatus for sealing an assembly consisting of a metal rod and a glass tube.

FIG. 2 is a view in cross section illustrating the sealing of the exhaust opening of a photoflash lamp within a vacuum chamber.

FIG. 1 shows by way of example a glass-to-metal seal according to the inventive principle. 1 denotes the radiator consisting of quartz glass and being heated by gas burners 2, particularly within zone Z. The workpiece consisting of a glass member 3 and a metal member 4 is heated by means of heat radiation, heat conduction and convection, particularly at the sealing spot until the glass softens and sealing is effected. Heating of the glass and metal takes place uniformly and excludes any danger from chemical reaction by means of hot gases. The space between quartz radiator and workpiece may, if desired, be filled with an inert gas. With the sealing operation terminated the burners 2 are removed or the flames considerably reduced, as is well-known in the art, thus permitting the sealing to cool off. This cooling off is sufficiently slow even on very sudden removal of the gas burners 2 due to the gradual stopping of the heat radiation of the quartz glass in order to achieve complete equalization of all inner tensions of the glass and thus effecting a breakproof and stable sealing.

FIG. 2 shows utilization of the invention in sealing of a small lamp 5 within a pumping chamber. As an example, such a lamp 5 is an incandescent lamp, glow lamp or combustion photoflash lamp, the exhaust opening 6 of which is located near a hood-like section 7 of the portion of the pumping chamber made of quartz glass. The interior of the pumping chamber 8 may be evacuated by means of the pumping connection 9, and, eventually, be filled with a gas of any desired pressure. This method proved particularly advantageous in the manufacture of lamps with a gasfilling exceeding atmospheric pressure. After the desired pressure conditions have been established in the pumping chamber 8 and thereby also in the lamp, zone 7 is very quickly heated up by means of two gas burners 10.

Then, by heat radiation the hot quartz glass in its turn heats up the glass of the exhaust opening 6 which begins to soften after 20 to 35 seconds. In case the pumping chamber 8 and lamp 5 are filled with a gas, then the radiation heating is further supported by heat conduction and concevtion and softening of the glass begins even more quickly. High sealing-off temperatures of narrow local limitation are obtained without considerably heating the lamp bulb or the more distant parts of the pumping chamber. For this reason it is possible to make only a small part of the pumping chamber of quartz glass and the remaining part from a less expensive material which is more easily processed, for instance from iron or brass. Since heating of the contact surfaces of quartz glass and metal remains low it is possible to make the resilient gaskets 11 of silicone rubber or "Teflon" (polytetrafluoroethylene).

A characteristic of this consant-pressure-method is that tipping off of the lamps is effected rapidly and very reliable without mechanical stress upon the glass merely by force of gravity and surface tension, and also with superpressure lamps without any violent failures.

Due to the advantages to be expected from this method it has been aimed at for a long time, but with the chamber materials utilized up to now without success to seal the exhaust openings of lamps within a vacuum or pressure chamber under the influence of exterior heat sources. Thus several methods have already become known for cementing the individual parts of a lamp within a pumping chamber by heating effected from the outside but those cemented lamps always proved a failure due to the gas delivery of the cement and the leakiness occurring because of the brittleness of the cemented place. Furthermore, it is known to shape the exhaust openings of lamps in a special manner, for instance funnel-like, and to mount therein an easily fusible glass solder which is brought to melting by heating a particularly thin-walled part of the metal wall of the pumping chamber and thus closes the exhaust opening. In contradistinction thereto it is possible by means of the present invention as utilized and represented in FIG. 2 to close the lamp within a pumping chamber much easier and more reliably by fusing the glass of the exhaust opening.

It is also possible to seal the lamp within the pumping chamber in upright instead of in suspended position. The first arrangement is preferred since the chamber, due to the better dissipation of the hot combustion gases of the gas burners 10, is but little exposed to the heating effect and ensures an improved closure by flowing together of the neck portion of the lamp so that the part of the pumping chamber to be made of quartz glass may be kept particularly small. It is easily possible with the method known per se to open the pumping chamber 8, for instance by raising the quartz glass hood 7 which must not by any means touch the pumping stem 6, to remove the finished lamp by means of a gripping device and to insert a new lamp.

By suitable shaping of the quartz glass hood 7 it is possible to equalize automatically the manufacturing tolerances of the pumping stem which effect fluctuation of the glass mass to be heated within a certain range and usually interfere in the case of known sealing methods. The pumping stem 6 becomes shorter during sealing procedure and simultaneously leaves the heating zone, thereby giving the glass mass an opportunity to cool off sufficiently slow to form a sealing spot completely free of tension.

Although two preferred embodiments of the invention have been disclosed, it will be understood that modifications may be made within the spirit and scope of the appended claim.

I claim:

The method of deforming a portion of a glass article by heating the article portion to be deformed to a temperature at which the glass comprising the article softens and deforms, which method comprises, selecting a glass composition having a higher softening temperature than the glass comprising said article, surrounding the article a portion of which is to be deformed with an outer envelope made from said selected glass composition, bringing a part of said envelope close to the portion of said article to be deformed, keeping a predetermined and substantially uniform distance between the portion of said article to be deformed and said part of the envelope, positioning an annular metal part in abutting relation with said part of the envelope, heating said annular metal part by high frequency to a temperature higher than the softening temperature of the glass article portion to be deformed but less than the softening temperature of the glass comprising the surrounding body, keeping said article and said envelope in a predetermined fixed position, and maintaining the heated condition of the surrounding glass body for a sufficient period of time to cause the surrounded glass article portion to soften and deform.

References Cited in the file of this patent

UNITED STATES PATENTS

| | | |
|---|---|---|
| 1,555,259 | Allcutt | Sept. 29, 1925 |
| 1,977,671 | De Neumann | Oct. 23, 1934 |
| 2,031,660 | Loepsinger | Feb. 25, 1936 |
| 2,048,556 | McArthur | July 21, 1936 |
| 2,135,775 | Walker | Nov. 8, 1938 |
| 2,332,099 | McKinnis | Oct. 19, 1943 |
| 2,386,820 | Spencer | Oct. 19, 1945 |
| 2,432,491 | Thomas | Dec. 9, 1947 |
| 2,508,127 | Valentine | May 16, 1950 |
| 2,713,532 | McCullough | July 19, 1955 |
| 2,792,271 | Beggs | May 14, 1957 |
| 2,795,018 | Shaw | June 11, 1957 |
| 2,837,396 | Warren | June 3, 1958 |
| 2,855,265 | Foote et al. | Oct. 7, 1958 |
| 2,871,623 | Marini | Feb. 3, 1959 |
| 2,875,556 | Vigna et al. | Mar. 3, 1959 |
| 2,930,098 | Emeis | Mar. 29, 1960 |